Figure 1:
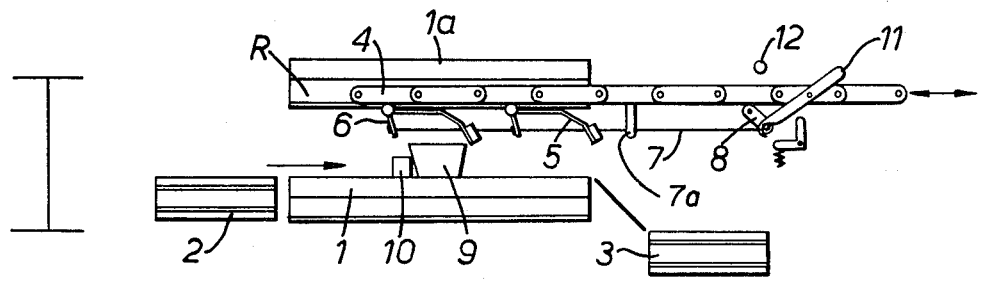
Figure 1:
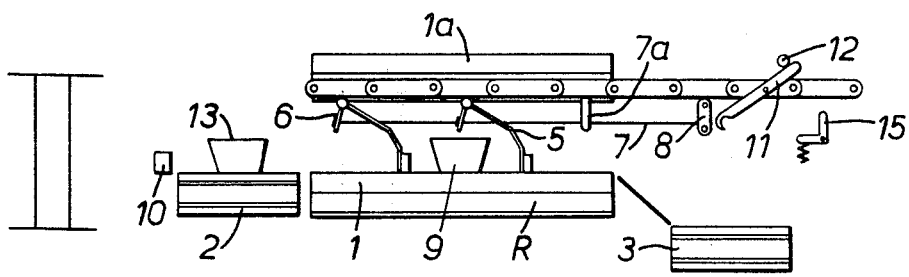
Figure 1:
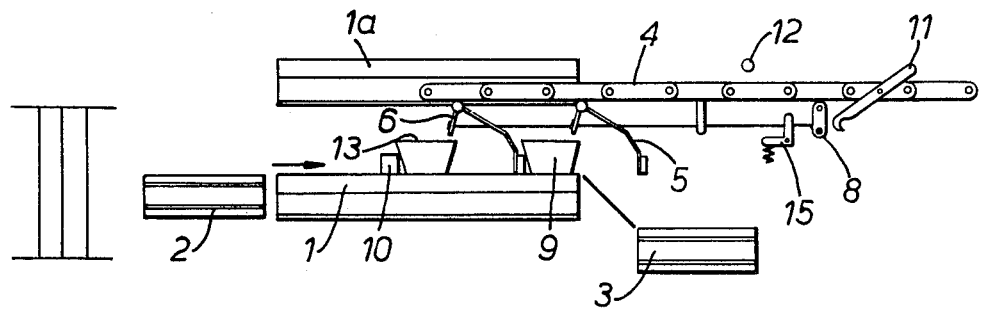

United States Patent [19]

Fenner

[11] 4,403,482
[45] Sep. 13, 1983

[54] AUTOMATIC PLATE FREEZERS

[75] Inventor: Frank R. Fenner, South Humberside, England

[73] Assignee: Jackstone Froster Limited, Grimsby, England

[21] Appl. No.: 373,274

[22] Filed: Apr. 29, 1982

[30] Foreign Application Priority Data

May 1, 1981 [GB] United Kingdom ............... 8113571

[51] Int. Cl.³ .............................................. F25C 5/14
[52] U.S. Cl. .................................... 62/341; 100/93 P; 198/743
[58] Field of Search .................... 62/341; 198/743; 100/93 R, 93 P

[56] References Cited

U.S. PATENT DOCUMENTS

| | | | |
|---|---|---|---|
| 2,381,185 | 8/1945 | Rogers et al. ................... | 198/743 |
| 2,988,204 | 6/1961 | Sutherland ...................... | 198/743 |
| 3,263,441 | 8/1966 | Rother ............................ | 62/341 |
| 3,548,997 | 12/1970 | Buchheit ........................ | 198/489 |
| 3,890,889 | 6/1975 | Fishburne ....................... | 198/743 |
| 3,955,376 | 5/1976 | Mekenitsky et al. ........... | 62/341 |
| 4,354,594 | 10/1982 | Galloway ........................ | 198/743 |

Primary Examiner—Ronald C. Capossela
Attorney, Agent, or Firm—Scrivener, Clarke, Scrivener and Johnson

[57] ABSTRACT

An automatic plate freezer in which articles are fed in rows on to a plate to be loaded and are advanced along the plate by driving members on a drive element supported on the next plate above, the driving members being movable between a first article engaging position for article advance and a second free position by a positioning member coupled to each driving member by a positioning means.

4 Claims, 3 Drawing Figures

AUTOMATIC PLATE FREEZERS

This invention is concerned with improvements in and relating to automatic plate freezers.

It is known to provide a plate freezer in which each of a plurality of freezer plates is brought into alignment with a receiving station for articles to be frozen, by relative movement of the plate and station. A row of articles is marshalled on the receiving station and a pusher sweeps the marshalled row onto the plate. This marshalling and sweeping action are repeated so that a new row is brought into abutting relationship with the previous row and moves the latter forward by a row width. This is again repeated, each added row pushing all those already on the plate forward by one row width until the plate is fully loaded whereupon a fresh plate is positioned relative to the receiving station for loading in similar fashion.

Such a loading system is satisfactory for regular shaped articles and articles which are relatively rigid so as to be able to withstand the pressures applied by the pusher and other articles.

It is an object of this invention to provide an automatic plate freezer which can handle articles which cannot be moved on a plate as abutting rows.

According to one aspect of this invention there is provided an automatic plate freezer which comprises a freezer plate, a receiving station where at least one row of articles can be positioned, the receiving station and the plate being positionable so that a row of articles may be advanced off the former on to the latter, a drive element movable reciprocally in a direction parallel with the direction of article advance, driving members carried by the drive element and pivotal between a first article engaging position and a second free position, and positioning means operable upon a positioning member coupled to the driving members which together set the driving members in the first position in the direction of travel for advancing articles and in the second position in the opposite direction of travel.

Figure 2:
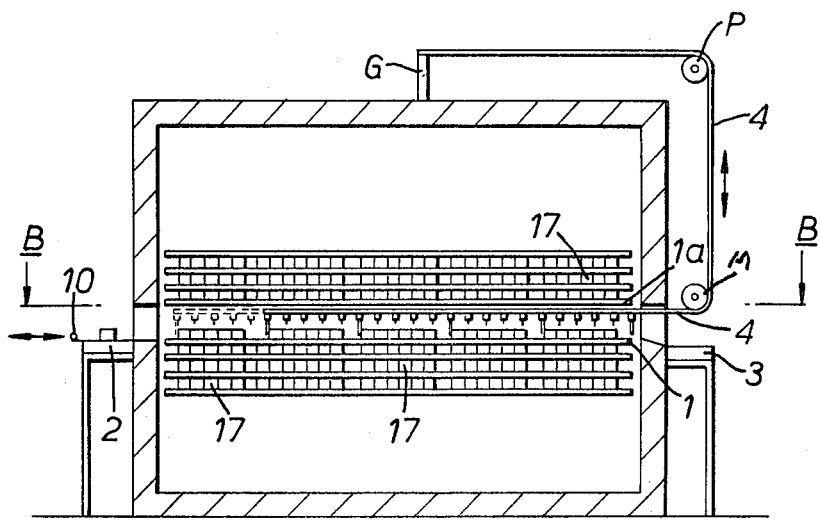
Figure 3:
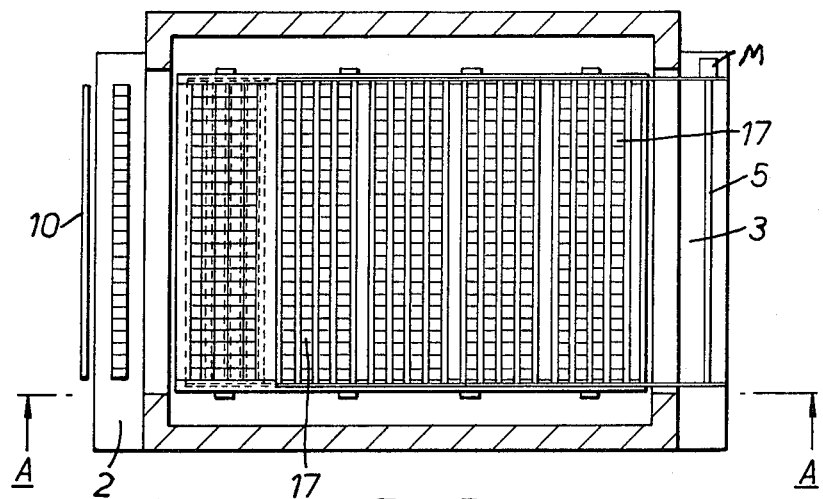

In order that the invention may be well understood there will now be described an embodiment thereof, given by way of example only, reference being made to the accompanying drawings in which:

FIG. 1 is a diagrammatic view showing three relative positions of an automatic plate freezer, during loading of a plate, the positions being designated I, II, III, FIG. 2 is a diagrammatic vertical section through a modified automatic plate freezer along the line A—A of FIG. 3, and FIG. 3 is a horizontal section on the line B—B of FIG. 2, this freezer incorporating the embodiment 4 FIG. 1.

Referring to FIG. 1 the freezer includes freezer plates 1, 1a, an in feed conveyor 2, output conveyor 3, a drive element 4 and driving members 5.

The driving element comprises a pair of spaced parallel chains between which extend and on which are pivotally mounted the driving members. Each driving member is provided with an actuator 6, the actuators being coupled together by a positioning member in the form of a wire 7, supported at 7a, which is itself anchored to a positioning lever 8 so that a pull on the wire by the lever will swing all the actuators and hence all the driving members anti-clockwise as shown from a first driving condition (as in II of FIG. 1) to a second free position (as in I of FIG. 1).

I and II of FIG. 1 show respectively the chain approaching the outermost (leftwards as viewed in the drawing) loading position of the driving element which is reciprocable by means not shown, and the outermost loading position of that reciprocal motion. The driving element is a pair of chains, of which only one chain can be seen, carried by runners diagramatically shown at R, preferably of L-section on plate 1a, each plate having such runners for reasons which will appear.

Assuming the freezer is empty and is to be loaded freezing plate 1a is lifted to an open condition position relative to plate 1 and rests on latches (not shown), the spacing between the plates in open condition being sufficient to allow articles to be frozen to move through the space. The plate 1 is positioned at a predetermined distance below the plate 1a such that the lower plate 1 is at a level coinciding with the level of the infeed conveyor 2. A row of product 9 is marshalled and fed onto the lower plate 1 by a pusher bar 10 actuated by means not shown. Thus far the procedure has been no different from operation of a known Automatic Plate Freezer.

Whilst this first row of product 9 is being marshalled on the infeed conveyor, drive motors (not shown) feed the chains into the runners on the top plate 1a and toward their extreme outermost loading position. During this travel the wire 7 is under tension such that the actuators 6 hold the driving members in the free position.

Upon reaching the outermost position, a latch 11 fitted to the chains comes up against a fixed delatcher 12 which acts upon the latch 11 to release lever 8 thereby releasing the wire tension and allowing the driving members to pivot down under their own weight to the driving position. It can now be seen that the outermost driving member is positioned behind the first row of product 9. The drive motors now reverse and pull the chain mechanism a predetermined distance along the top runner. This causes the row of product 9 to be pushed by the driving member an equal distance along the lower plate thereby leaving room for the next row of product 13 to be fed onto the lower plate 1. At III in FIG. 1 the first row of product has been advanced by the outermost driving member.

Whilst the next row of product 13 is being marshalled and fed onto the lower plate the drive motor again feeds the chain mechanism toward its outermost position.

As the chain mechanism moves from its innermost towards its outermost position see III FIG. 1, the lever 8 comes up against a fixed latcher 15. As the lever 8 moves past this fixed latcher 15 it tensions the wire 7 thereby lifting the driving members by their actuators 6 to the free position where they pass over the next row of incoming product 13. Also as the lever 8 moves past the fixed latcher 15 it is engaged by the latch 11. On reaching the fixed delatcher 12, the lever 8 releases the tension in the wire as before. This is repeated until the lower plate is completely full of rows of product. At this point, the chain mechanism on its outward travel is stopped just short of its outermost position, so that the latch 11 does not reach the fixed delatcher 12. In that condition, driving members and pushers in the free position, the chains are pulled completely out of the runners on the top plate i.e. toward the right as seen in the drawing. The plates are then raised first, to move the plates to a closed condition where the articles to be frozen are in contact with each plate and, second, to position the next empty plate in the feed position. When all plates are full of unfrozen products, products fed into the machine first would now be frozen. When this plate full of frozen products is again positioned at the feed position, it can clearly be seen that the previously described mode of operation of the chain mechanism will discharge the frozen product onto the output conveyor 3 from the initially lower plate at the same time as loading unfrozen product.

If it is required to completely empty a machine of frozen product and not reload with unfrozen product the method is as follows:

Upon reaching the outermost point the driving members are delatched into their engaging position as for normal operation. The drive motor again reverses, but this time the chains are pulled from the top runner completely at a predetermined rate thereby discharging all rows of frozen product from the lower plate. This is repeated until the machine is completely empty of frozen product. Under this mode of operation the marshalling and feed mechanisms are not used.

Experience has shown that it is quite possible for one row of non cuboid products to push other rows of non cuboid products e.g. foil containers.

Referring now to FIGS. 2 and 3 depending on the size and rigidity of the product containers being used, it would be possible to feed each of a number of rows of product in modules or blocks 17 into the machine using the mechanism previously described. In FIGS. 2 and 3 five such modules or blocks 17 occupy a plate. It can be clearly seen that under such circumstances only five driving members would be required, and all intermediate driving members and pushers would have been permanently latched in their raised position.

When operating in this mode, it is necessary for the chains to be pulled out from the runner of the upper plate a distance sufficient to move a module or block into the next position along the bottom plate. In this mode latching is carried out by latcher 15 in a different position to that of FIG. 1. Latcher 15 is fitted to a slide and can be set in any position within this slide. This will enable modules or blocks of sizes other than that illustrated to be fed onto the lower plate provided a whole number of those modules or blocks can fit onto the lower plate allowing sufficient clearance for the operation of the drive members. The required number of driving members and pushers to be used is determined by the number of modules or blocks selected.

If the machine is required to freeze packages handled in known automatic plate freezers, then the chain mechanism is not required for introducing the product. This is carried out as described previously by the standard feed mechanism. However for total emptying of the frozen cuboid packages the chain mechanism can be used in the same mode just described in respect of emptying non cuboid packages. In this instance the end most driving member adjacent the input conveyor is positioned behind the module of frozen cuboid packages which occupies the total area of the bottom plate. It would be feasible to allow all other cross members and pushers to be actuated in the normal way, and simply be allowed to rest on the frozen cuboid module. However if required all these other cross members and pushers could be permanently latched in position as previously described.

To exemplify the chain drive, the chain is shown in FIG. 2 as driven by a motor M, and any suitable guides and pulleys such as G and P are provided allowed to rest on the frozen cuboid module. However if required all these other cross members and pushers could be permanently latched in position as previously described.

To exemplify the chain drive, the chain is shown in FIG. 2 as driven by a motor M, and any suitable guides and pulleys such as G and P are provided to support the chains outside the freezer.

As will be readily understood, various modifications may be made to the above described apparatus. Thus for example the wire 7 might be replaced by other tensional means such as a roller chain. Also the latching and unlatching mechanism may take other specific forms but still carry out the required function of correctly positioning the driving members. With regard to suitable materials for the runners, they will preferably be of an ultra high molecular weight polyethylene.

I claim:

1. In an automatic plate freezer including at least two freezer plates movable between an open condition enabling articles to be frozen to be moved through the space between the plates and a closed condition wherein said articles are engaged by each plate, a receiving station where at least one row of articles can be positioned, one of said plates in its opened condition being disposed in a position to receive articles from said receiving station, and advancing means to advance a row of articles from the receiving station onto said one of said plates, the invention comprising a drive element movable reciprocally in opposite directions parallel to the direction of advance of said articles, driving members spaced along and pivotal relative to said drive element between an article engaging first position and an inoperative second position, means biasing said drive members towards their first position, an operating member coupled to each of said driving members for effecting movement of said driving members between their first and second positions, a positioning element movable between a first position where it engages with the operating member to retain the driving members in their second position during movement of said drive element in a direction away from the direction of advance of said articles and a second position where said positioning member releases said operating member during advance movement of said drive element to effect movement by said biasing means of said driving members to their first position, means cooperating with movement of said drive element to move said positioning element between its first and second positions depending upon whether said drive element is moving away from or towards the direction of advance of said articles, and means operable to withdraw said drive element and said driving members from between the plates when the desired number of rows of articles have been located on the freezer plate by the advancing means to permit the plates to be moved relative to one another to the closed condition.

2. An automatic plate freezer according to claim 1 in which said positioning member comprises a latch pivoted to said driving element to retain the operating member and hence the driving members in the second position, said means cooperating with movement of said drive element comprising a latcher and an unlatcher located in the path of movement of said latch so that as the driving members advance, the operating member is free and on the return travel said operating member is latched to retain the driving members in the second position.

3. An automatic plate freezer according to claim 1 in which there is a plurality of plates one above another, each plate having means to support and guide the drive element relative to the plate being loaded, said drive element being supported and guided by the support and guide means of the plate above.

4. An automatic plate freezer according to claim 1 in which the driving members are spaced along the drive element to accommodate a plurality of rows of articles therebetween which will be moved as a module of rows.

* * * * *